United States Patent
Cukierman et al.

(10) Patent No.: US 12,227,035 B2
(45) Date of Patent: Feb. 18, 2025

(54) TIRE PROVIDED WITH A RADIO FREQUENCY COMMUNICATION MODULE

(71) Applicant: COMPAGNIE GENERALE DES ETABLISSEMENTS MICHELIN, Clermont-Ferrand (FR)

(72) Inventors: Florian Cukierman, Clermont-Ferrand (FR); Yann Hye, Clermont-Ferrand (FR)

(73) Assignee: COMPAGNIE GENERALE DES ETABLISSEMENTS MICHELN, Clermont-Ferrand (FR)

(*) Notice: Subject to any disclaimer, the term of this patent is extended or adjusted under 35 U.S.C. 154(b) by 59 days.

(21) Appl. No.: 16/978,228

(22) PCT Filed: Mar. 6, 2019

(86) PCT No.: PCT/FR2019/050493
§ 371 (c)(1),
(2) Date: Sep. 4, 2020

(87) PCT Pub. No.: WO2019/170998
PCT Pub. Date: Sep. 12, 2019

(65) Prior Publication Data
US 2021/0001671 A1   Jan. 7, 2021

(30) Foreign Application Priority Data

Mar. 7, 2018 (FR) ...................... 1851974

(51) Int. Cl.
*B60C 15/06* (2006.01)
*B60C 15/00* (2006.01)
*B60C 19/00* (2006.01)

(52) U.S. Cl.
CPC .......... *B60C 19/00* (2013.01); *B60C 15/0027* (2013.01); *B60C 15/0607* (2013.01);
(Continued)

(58) Field of Classification Search
CPC .......... B60C 2019/004; B60C 15/0018; B60C 15/0072; B60C 15/0607; B60C 15/0009; B60C 15/0027
See application file for complete search history.

(56) References Cited

U.S. PATENT DOCUMENTS 5,526,863 A * 6/1996 Hodges ............... B60C 15/0607
152/550
7,009,576 B2 3/2006 Adamson et al.
(Continued)

FOREIGN PATENT DOCUMENTS

CN   1557107 A   12/2004
CN   101734112 A   6/2010
(Continued)

OTHER PUBLICATIONS

International Search Report dated Jun. 4, 2019, in corresponding PCT/FR2019/050493 (6 pages).

*Primary Examiner* — Kendra Ly
(74) *Attorney, Agent, or Firm* — VENABLE LLP

(57) ABSTRACT

A tire is equipped with a radiofrequency communication module with a carcass reinforcement comprising two carcass plies such that the communication module is positioned in the bead axially on the outside of and against the second carcass ply.

11 Claims, 4 Drawing Sheets

(52) U.S. Cl.
CPC .. *B60C 15/0072* (2013.01); *B60C 2015/0621* (2013.01); *B60C 2019/004* (2013.01)

(56) References Cited

U.S. PATENT DOCUMENTS

| | | | |
|---|---|---|---|
| 9,070,069 | B2 | 6/2015 | Sinnett |
| 9,114,671 | B2 | 8/2015 | Adamson et al. |
| 10,339,435 | B2 | 7/2019 | Destraves |
| 2008/0289736 | A1* | 11/2008 | Adamson ............ B60C 23/0493 156/110.1 |
| 2010/0123584 | A1 | 5/2010 | Lionetti et al. |
| 2013/0153669 | A1 | 6/2013 | Sinnett |
| 2016/0107490 | A1 | 4/2016 | Randall et al. |
| 2018/0134100 | A1* | 5/2018 | Kawaguchi ............... B60C 9/08 |
| 2018/0174015 | A1* | 6/2018 | Destraves ............... B60C 19/00 |
| 2019/0322142 | A1 | 10/2019 | Lallement et al. |
| 2020/0247193 | A1* | 8/2020 | Nakajima ............... B60C 15/06 |

FOREIGN PATENT DOCUMENTS

| | | | |
|---|---|---|---|
| EP | 1977912 A1 | 10/2008 | |
| EP | 2186658 A1 | 5/2010 | |
| FR | 3059603 A1 | 6/2018 | |
| WO | 2012/030321 A1 | 3/2012 | |
| WO | 2016/060851 A1 | 4/2016 | |
| WO | WO-2016193457 A1 * | 12/2016 | ......... B29D 30/0061 |

* cited by examiner

TIRE PROVIDED WITH A RADIO FREQUENCY COMMUNICATION MODULE

FIELD OF THE INVENTION

The present invention relates to tyres, and more particularly to a tyre equipped with a radiofrequency communication module.

PRIOR ART

It applies in particular, although not exclusively, to a tyre for a motor vehicle of the passenger vehicle type for powerful high-speed vehicles. Such a tyre generally comprises a carcass reinforcement with more than one, for example two, carcass plies having threads made of nonmetallic material, for example made of rayon, nylon or polyester.

The axial, radial and circumferential directions of a tyre will be defined relative to the axis of revolution of this tyre.

A tyre comprising a radiofrequency communication module is already known from the prior art, notably from EP 2 186 658 A1. In that document, the radiofrequency communication module comprises a passive radiofrequency identification transponder equipped with two antennas forming a dipole. This type of transponder is generally known by the acronym RFID. Such a member is able to store data, for example relating to the identity, to the type and to the date of manufacture of the tyre.

The tyre described in EP 2 186 658 A1, notably illustrated in FIGS. 7B and 9B, comprises a crown, two sidewalls and two beads with an axis of revolution and a carcass reinforcement with two carcass plies each anchored in each bead, each bead comprising a bead wire, a part of the first carcass ply extended by a turn-up around the bead wire such that the end of the turn-up is situated axially and radially on the outside relative to the bead wire, a filler arranged radially on the outside relative to the bead wire and axially between the first carcass ply and the turn-up, a part of the second carcass ply arranged axially on the outside relative to the first carcass ply, to the filler and to the turn-up, a protective cushion rubber and a sidewall rubber which are axially furthest towards the outside.

This tyre is such that it comprises a communication module positioned axially between the filler and the sidewall rubber and at the interface between the turn-up of the first carcass ply and the filler.

Although the positioning of such a communication module is good overall in terms of radiocommunication, it does have limits in terms of UHF radiofrequency performance which is sensitive to the metal, notably when the carcass plies are made up of metal threads. However, even when the threads are nonmetallic, embedding the communication module within the bead, although good for the endurance of the tyre and the physical integrity of the communication module, is not good for excellent radiocommunications performance.

It is an objective of the invention to propose an improvement to the UHF radiocommunications performance without in so doing impairing the endurance of the tyre.

BRIEF DESCRIPTION OF THE INVENTION

The subject of the invention is a similar tyre wherein an additional filler is positioned axially between the second carcass ply and the assembly made up of the protective rubber and the sidewall rubber and wherein the communication module is positioned at the interface between the second carcass ply and the additional filler.

The Applicant Company has observed that the position axially on the outside relative to the second carcass ply makes it possible to limit the stresses experienced by the communication module in comparison with the position between the filler and this second carcass ply. This position also has the advantage of very greatly limiting the risk of faults, for example the initiation and spread of cracks, associated with the presence of the communication module in comparison with a position axially on the inside relative to the second carcass ply. Specifically, positioning the second carcass ply as a separator between the communication module and the assembly made up of the filler and of the first carcass ply makes it possible to create a physical barrier between the communication module and the ends of the first carcass ply and of the bead filler. In this way, the risk of damage to the tyre by insertion of the communication module near these ends is limited. This position is also favourable in terms of the quality of communications of the communication module with an external reader. Specifically, the communication module is kept away from the metallic region such as the bead wire or potentially metallic region such as the first and second carcass plies. Further, this position is not detrimental to physically incorporating the communication module, which remains protected from attack coming from outside the tyre, such as knocks caused by kerbing for example, by the additional filler, the protective rubber and the sidewall. Finally, resting the communication module on the second carcass ply allows the communication module to be positioned easily with respect to structural details of the tyre such as the ends of the turn-up of the first carcass ply or the end of the bead filler which are more easy to identify on the green tyre from the second carcass ply than they are through a thick rubber such as the additional filler. Specifically, the first carcass ply and the bead filler will be positioned on the tyre-building drum before the second carcass ply; and once the communication module has been placed on the second carcass ply, everything is then covered with the additional filler.

In one specific embodiment, with the turn-up of part of the first carcass ply having an end situated radially below the radially outer end of the filler, the communication module is positioned radially substantially at the level of the end of the filler.

In this configuration, it is preferable to position the communication module radially outermost thus facilitating radiocommunications performance while at the same time preserving the endurance of the tyre and the integrity of the communication module. For the sake of the physical integrity of the communication module, the latter needs, as far as possible, to be situated in or in the immediate vicinity of the bead of the tyre which constitutes a rigid region of the tyre. The presence of the second carcass ply on which the communication module rests makes it possible partially to overcome the disadvantages represented by the ends of the turn-up of the first carcass ply or of the bead filler.

As a preference, with the radiofrequency communication module comprising a radiofrequency transponder encapsulated in a mass of electrically insulating encapsulation rubber and with the transponder comprising an electronic chip coupled to a radiating antenna defining a first longitudinal axis, this first longitudinal axis is oriented circumferentially.

According to one particular embodiment, this mass of encapsulation rubber may consist of two sheets of rubber sandwiching the radiofrequency transponder.

This is a simple and effective way of encapsulating the radiofrequency transponder to make the radiofrequency transponder easier to handle. As a result, it is easier to introduce into the green form of the tyre.

According to one preferred embodiment, the tensile elastic modulus of the encapsulating rubber mass is lower than or equal to the tensile elastic modulus of the adjacent rubber compounds.

This makes it possible to ensure good tyre endurance and physical integrity of the radiofrequency transponder by minimizing the stresses in the regions surrounding where the communication module is introduced into the tyre and makes it easier for this encapsulating rubber to deform rather than subjecting the components of the tyre to forces that could potentially be sources of damage.

According to another preferred embodiment, the relative dielectric constant of the encapsulating mass is lower than the relative dielectric constant of the adjacent rubber compounds.

This feature makes it possible to improve radiofrequency communications to and from the radiofrequency transponder by minimizing energy losses in the encapsulating rubber.

The orientation of the first longitudinal axis is perpendicular to the threads of the carcass plies and is very favourable in terms of the mechanical integrity of the transponder and in terms of the quality of reading of the transducer.

As a preference, the first longitudinal axis of the radiofrequency transponder is positioned radially at a distance less than 30 mm from the radially outer end of the filler.

Highly preferably, this distance is less than 10 mm.

Positioning the communication module with respect to and at the level of the radially outer end of the filler is advantageous from an industrial standpoint because it is easy to position the part-finished communication module after having positioned the second carcass ply and this radial position has already been identified.

In a first embodiment of the radiofrequency transponder, the radiating antenna of the radiofrequency transponder comprises two helical antenna segments. The electronic chip is then galvanically connected to the two helical antenna segments.

In a second embodiment of the radiofrequency transponder, the radiofrequency transponder of the electronic member additionally comprises a primary antenna electrically, which is to say galvanically, connected to the electronic chip. The primary antenna is inductively coupled to the radiating antenna which is a dipole antenna consisting of a single-strand helical spring defining the first longitudinal axis.

In one specific mode of embodiment of this second embodiment of the radiofrequency transponder, the primary antenna is a coil having at least one turn defining a second longitudinal axis. The coil is circumscribed by a cylinder, the axis of revolution of which is parallel to the second longitudinal axis and the diameter of which is between a third and three times, preferably between half and two times, the mean diameter of the helical spring of the radiating antenna.

This configuration makes it possible to obtain quality performance of radiofrequency communications between the primary antenna and the radiating antenna, making it possible to achieve the desired radiofrequency communications performance at the level of the radiofrequency transponder when it is situated inside the tyre.

In one specific mode of embodiment of the second embodiment of the radiofrequency transponder, with the radiating antenna having a central region between two lateral regions and the primary antenna having a median plane perpendicular to the second longitudinal axis, the first and second longitudinal axes are parallel to one another and the median plane of the primary antenna is arranged in the central region of the radiating antenna.

This positioning ensures better-quality inductive coupling because the magnetic field is strongest at the centre of a coil through which an electric current passes.

According to another specific mode of embodiment of the second embodiment of the radiofrequency transponder, the primary antenna is placed inside the single-strand helical spring of the radiating antenna.

In this configuration, the spatial bulk of the radiofrequency transponder is reduced, the electronic module becoming a detail on the scale of the dimensions of the tyre, thereby guaranteeing the tyre even greater endurance.

DESCRIPTION OF THE FIGURES

The various subjects of the invention will be better understood by means of the following detailed description and the attached drawings, in which the same reference numbers are used throughout to reference parts which are identical, and in which.

DETAILED DESCRIPTION OF THE INVENTION

In what follows, the terms "rubber compound", "rubber" and "compound" are used interchangeably to identify rubber constituents of the tyre.

Figure 1:
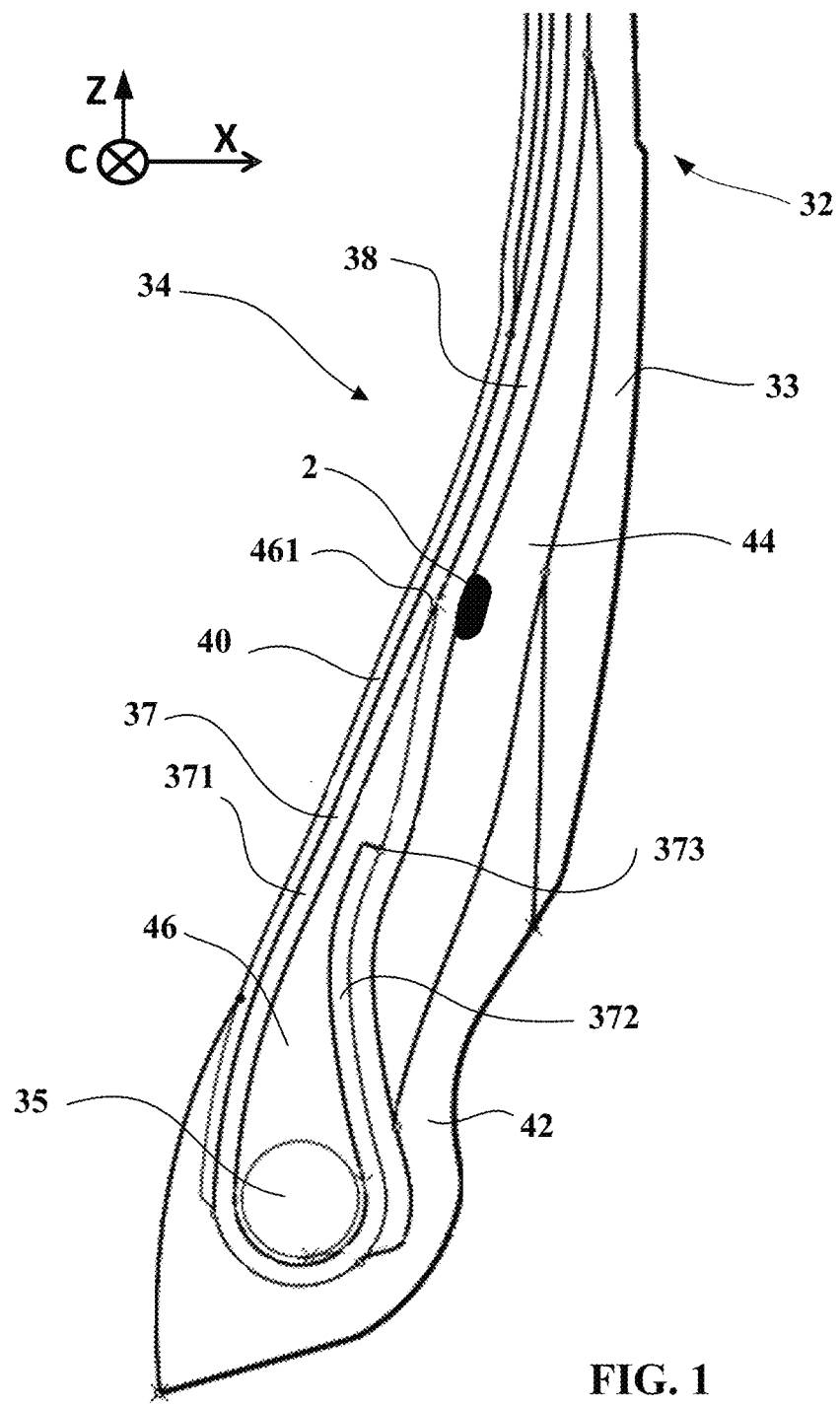
FIG. 1 illustrates in partial axial cross section a bead of a tyre according to the invention.

The axial direction X, circumferential direction C and radial direction Z of the bead 34 of a tyre according to the invention are indicated in FIG. 1.

As regards the axial direction, what is meant by "axially outer" is an axial direction directed towards the exterior of the tyre and what is meant by "axially inner" is an axial direction directed towards the internal cavity of the tyre.

A tyre conventionally comprises a crown, two sidewalls and two beads. Only the radially inner part of the sidewall 32 and the bead 34 are depicted in FIG. 1. The bead 34 depicted in FIG. 1 comprises a bead wire 35 exhibiting symmetry of revolution, a first carcass ply 37 with a first part 371 extending from the sidewall 32 towards the bead wire 35 extended by a turn-up 372 wound around the bead wire 35 and extending radially on the outside as far as an end 373. This turn-up 372 is positioned axially towards the outside of the bead 34 of the tyre. A filler 46 is positioned radially on the outside relative to the bead wire 35 and axially between the first part 371 of the first carcass ply 37 and the turn-up 372. This filler 46 extends radially on the outside as far as an end 461. It should be noted that the end 461 of the filler is situated radially on the outside relative to the end 373 of the turn-up 372.

The bead also comprises a second carcass ply 38 extending from the sidewall 32 as far as the bead wire 35. This second carcass ply 38 is positioned axially on the outside relative to the first carcass ply 37, to the filler 46 and to the turn-up 372. The two carcass plies 37 and 38 are, as is known per se, made up of plies reinforced by what are known as "radial" cords, for example here of textile, that is to say that these cords are disposed virtually parallel to one another and extend from one bead to the other so as to form with the median circumferential plane EP of the tyre an angle of between 80° and 90°. An airtight inner liner 40 extends from one bead to the other radially on the inside with respect to the first carcass ply 37. The bead 34 comprises a protective rubber (or "protector" or "cushion gum") 42 able to make contact with the surface of a rim. This cushion gum extends radially on the outside as far as an interface with a sidewall rubber 33. The cushion gum 42 and the sidewall rubber 33 constitute the exterior layer of the tyre. The bead 34 also comprises an additional filler 44 arranged axially between the second carcass ply 38 on the one hand, and the cushion gum 42 and sidewall rubber 33 on the other.

The bead 34 also comprises a radiofrequency communication module 2 positioned axially at the interface between the second carcass ply 38 and the additional filler 44 and radially between the end 461 of the filler 46 and the end 372 of the turn-up 371 of the first carcass ply.

Figure 2:
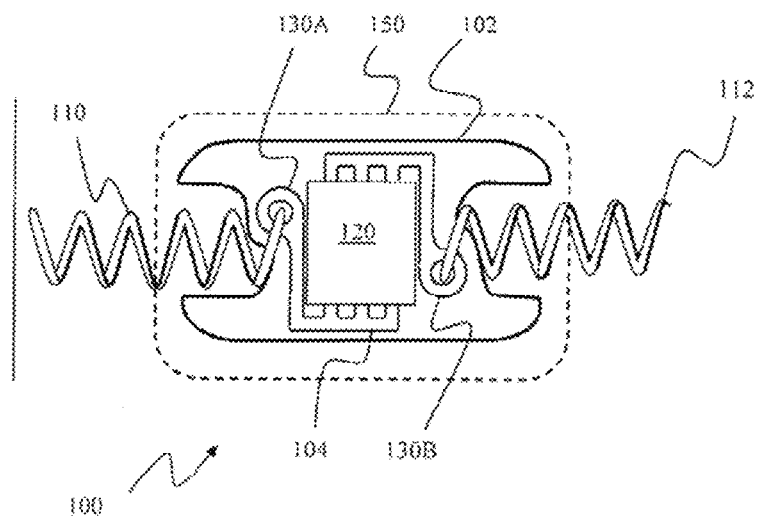
FIG. 2 depicts a typical radiofrequency transponder.

As indicated in FIG. 2, a conventional radiofrequency transponder comprises an electronic chip galvanically coupled to a radiating antenna made up of two helical half-antennas defining a first longitudinal axis. In the bead of the tyre, this first longitudinal axis defined by the axis of the radiating antenna is oriented circumferentially and therefore perpendicular to the reinforcing threads of the two carcass plies. This orientation is highly favourable in terms of the mechanical integrity of the radiofrequency transponder and in terms of the quality of communication with an external reader.

Figure 3:
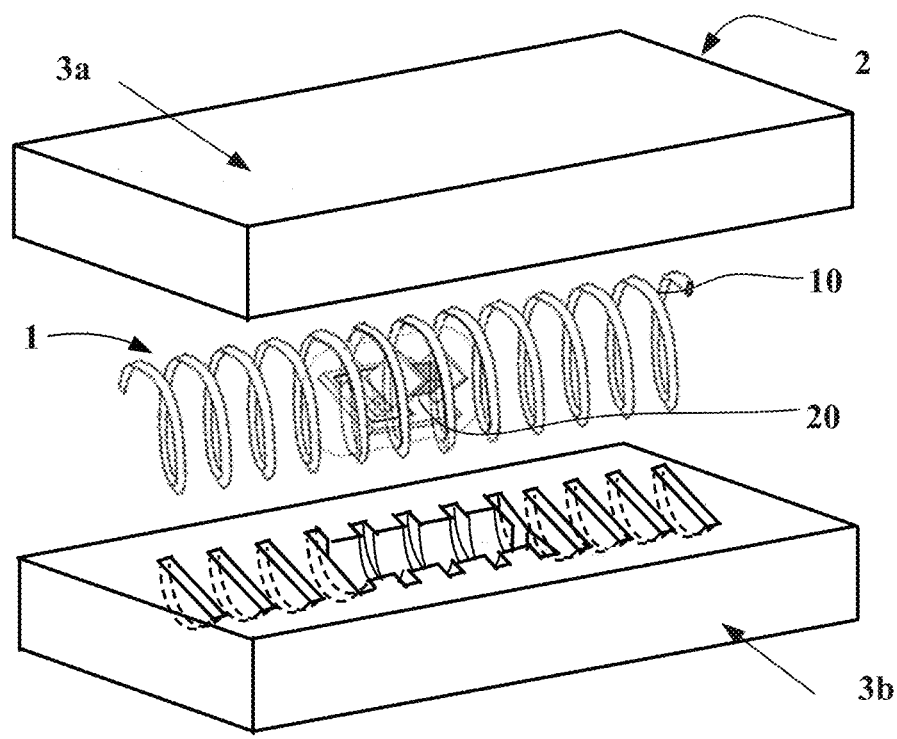
FIG. 3 is a schematic exploded view of a communication module.

FIG. 3 is a exploded view of an electronic member 2. This member 2 comprises a radiofrequency transponder 1 embedded between two layers 3a and 3b of a non-vulcanized electrically insulating elastomer compound. Such an electronic member is a semi-finished product able to be integrated into the structure of a tyre during the manufacture thereof.

The encapsulating elastomer compound contains 100 phr (parts by weight per 100 parts of elastomer) of a polymer such as EPDM (ethylene propylene diene monomer rubber), butyl rubber, neoprene or a diene elastomer such as SBR (styrene-butadiene rubber), polybutadiene, natural rubber or polyisoprene.

The compound may contain fillers such as silica, carbon black, chalk and kaolin fillers:
- with a silica filler in a maximum amount of 50 phr;
- with a carbon black filler of ASTM grade higher than 700, in an amount lower than 50 phr;
- with a carbon black filler of grade lower than or equal to 500, in a maximum amount of 20 phr.
- it is possible to add or replace these fillers with chalk or kaolin.

Such amounts and types of fillers make it possible to guarantee a relative permittivity lower than 6.5, in particular at a frequency of 915 MHz.

The stiffness in the cured state of the encapsulating compound is preferably lower than or close to those of the adjacent compounds.

In a first embodiment, the radiofrequency transponder of the communication module 20 is a conventional radiofrequency transponder, such as depicted in FIG. 2 and described in document WO 2012/030321 A1. This transponder 100 comprises an electronic chip 120 fastened to a carrier or PCB (printed circuit board) 102 and galvanically connected, via conductive tracks 104 and soldered joints 130, to two half-antennas 110 and 112. The antennas are helical springs the solid core of which is steel wire. The electronic portion and at least part of the antennas are embedded in an insulating rubber compound 150 as previously described.

The steel wire of the antennas is coated with a conduction layer made of copper, aluminium, silver, zinc or brass covered if necessary with a chemically isolating layer for example made of brass, zinc, nickel or tin in order to protect the rubber compound from the material of the conduction layer.

The electromagnetic conduction of such an antenna occurs mainly via a skin effect, i.e. it mainly occurs in the exterior layers of the antenna. This skin thickness is in particular dependent on the function of the radiating frequency and of the material from which the conduction layer is made. By way of example, for a UHF frequency (for example 915 MHz), the skin thickness is of the order of 2.1 µm for silver, 2.2 µm for copper, and 4.4 µm for brass.

The steel wire may be coated with these layers then formed; alternatively it may also be formed then coated.

The radiofrequency transponder 1 of the electronic member 2 such as shown in FIG. 3 corresponds to a second embodiment of the electronic member 2 that will now be described.

The radiofrequency transponder 1 according to the second embodiment of the electronic member 2 comprises an electronic portion 20 and a radiating antenna 10 able to communicate with an external radiofrequency reader. The electronic portion 20 (see FIG. 6) comprises an electronic chip 22. It additionally comprises a primary antenna 24 electrically connected to the electronic chip 22 and inductively coupled to the radiating antenna 10. The radiating antenna is a dipole antenna consisting of a single-strand helical spring defining a first longitudinal axis.

Figure 4:
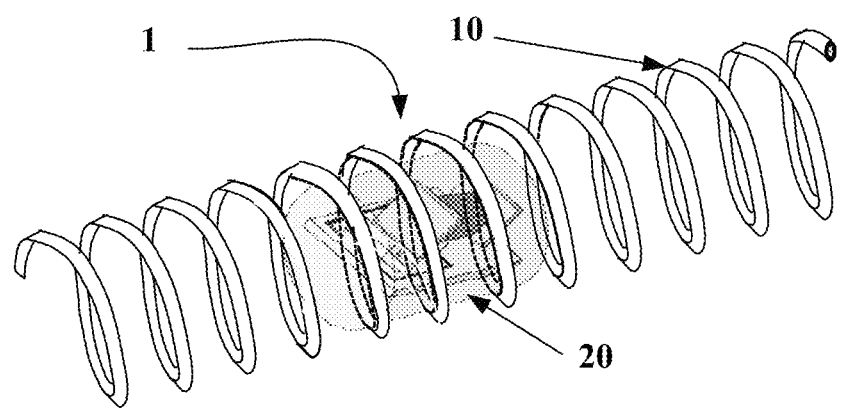
FIG. 4 is a perspective view of a radiofrequency transponder according to one embodiment of the invention in a configuration in which the electronic portion is located inside the radiating antenna.

FIG. 4 shows a radiofrequency transponder 1 in a configuration in which the electronic portion 20 is located inside the radiating antenna 10. The geometric shape of the electronic portion 10 is circumscribed by a cylinder the diameter of which is smaller than or equal to the inside diameter of the helical spring. This makes it easier for the electronic portion 20 to be inserted into the radiating antenna 10. The median plane 21 of the primary antenna is located in the central region of the radiating antenna and substantially superposed on the median plane of the radiating antenna 10.

Figure 5:
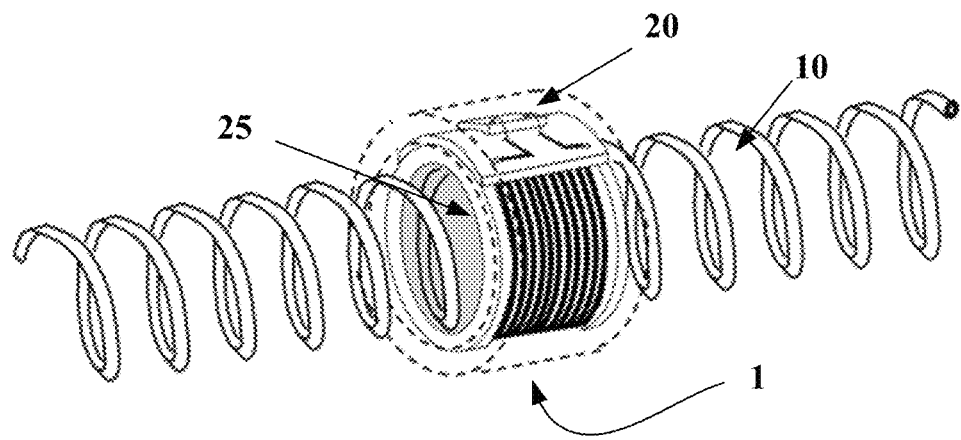
FIG. 5 is a perspective view of a radiofrequency transponder according to the invention in a configuration in which the electronic portion is located outside the radiating antenna.

FIG. 5 shows a radiofrequency transponder 1 in a configuration in which the electronic portion 20 is located outside the radiating antenna 10. The geometric shape of the electronic portion 20 has a cylindrical cavity 25 the diameter of which is larger than or equal to the outside diameter of the radiating antenna 10. This makes it easier for the radiating antenna 10 to be inserted into the cylindrical cavity 25 of the electronic portion. The median plane 21 of the primary antenna is located in the central region of the radiating antenna and substantially in the median plane of the radiating antenna 10.

Figure 6:
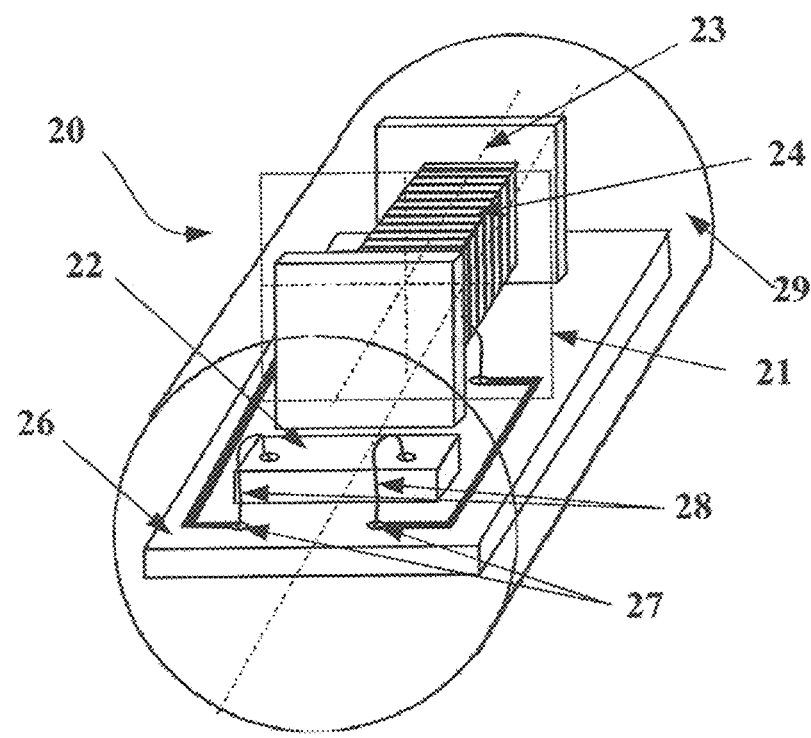
FIG. 6 is a perspective view of the electronic portion of a radiofrequency transponder in a configuration in which the electronic portion is located inside the radiating antenna.

FIG. 6 shows the electronic portion 20 of a radiofrequency transponder 1 intended for a configuration in which the electronic portion 20 is located inside the radiating antenna 10. The electronic portion 20 comprises an electronic chip 22 and a primary antenna 24 that is electrically connected to the electronic chip 22 via a printed circuit board 26. The primary antenna here consists of a surface-mount-device (SMD) microcoil having an axis of symmetry 23. The median plane 21 of the primary antenna defined by a normal parallel to the axis of symmetry 23 of the SMD coil and separating the coil into two equal portions is determined. The components on the printed circuit board are electrically connected using tracks made of copper terminated by copper pads 27. The components on the printed circuit board are electrically connected using the wire-bonding technique by gold wires 28 running between the component and the pads 27. The assembly consisting of the printed circuit board 26, of the electronic chip 22 and of the primary antenna 24 is embedded in a rigid mass 29 made of electrically insulating high-temperature epoxy resin forming the electronic portion 20 of the radiofrequency transponder 1.

This radiofrequency transponder 1 has the advantage of being mechanically far stronger than conventional transponders.

The invention claimed is:

1. A tire comprising a crown, two sidewalls and two beads with an axis of revolution and a carcass reinforcement with two carcass plies, each anchored in each bead, each bead comprising:
    a bead wire;
    a part of a first carcass ply extended by a turn-up around the bead wire of the first carcass ply such that the end of the turn-up is situated axially and radially on an outside relative to the bead wire;
    a filler arranged radially on the outside relative to the bead wire and axially between the first carcass ply and the turn-up;
    a part of a second carcass ply arranged axially on the outside relative to the first carcass ply, to the filler and to the turn-up;
    a protective rubber and a sidewall rubber axially furthest toward the outside and forming a first interface between the protective rubber and the sidewall rubber; and
    a communication module comprising a radiofrequency transponder with an electronic chip and a helical radiating antenna,
    wherein an additional filler is positioned axially between the second carcass ply and the cushion gum and the sidewall rubber,
    wherein a radially outer end of the additional filler extends radially further than a radially outer end of the filler,
    wherein the communication module is positioned at a second interface between the second carcass ply and the additional filler,
    wherein, with the turn-up having an end situated radially below the radially outer end of the filler, the communication module is positioned radially at a level of the end of the filler, and
    wherein a radially outermost end of the first interface between the protective rubber and the sidewall rubber extends radially on the outside to the communication module.

2. The tire according to claim 1, wherein, with the helical radiating antenna of the radiofrequency transponder defining a first longitudinal axis, the first longitudinal axis is oriented circumferentially.

3. The tire according to claim 1, wherein, with the radiating antenna comprising two helical antenna segments, the electronic chip is galvanically connected to the two helical antenna segments.

4. The tire according to claim 1, wherein the communication module consists of the radiofrequency transponder encapsulated in an electrically insulating encapsulating rubber mass.

5. The tire according to claim 4, wherein the radiofrequency transponder is sandwiched between two sheets of rubber.

6. The tire according to claim 4, wherein a tensile elastic modulus of the encapsulating rubber mass is lower than or equal to a tensile elastic modulus of adjacent rubber compounds.

7. The tire according to claim 4, wherein a relative dielectric constant of the encapsulating rubber mass is lower than a relative dielectric constant of adjacent rubber compounds.

8. The tire according to claim 1, wherein the radiofrequency transponder further comprises a primary antenna electrically connected to the electronic chip, wherein the primary antenna is inductively coupled to the helical radiating antenna, and wherein the helical radiating antenna is a dipole antenna consisting of a single-strand helical spring defining a first longitudinal axis.

9. The tire according to claim 8, wherein the primary antenna is a coil having at least one turn defining a second longitudinal axis that is circumscribed by a cylinder an axis of revolution of which is parallel to the second longitudinal axis and a diameter of which is between one third and three times the average diameter of the helical spring of the helical radiating antenna.

10. The tire according to claim 9, wherein, with the helical radiating antenna having a central region between two lateral regions and the primary antenna having a median plane perpendicular to the second longitudinal axis, the first and second longitudinal axes are parallel to one another and the median plane of the primary antenna is arranged in a central region of the helical radiating antenna.

11. The tire according to claim 8, wherein the primary antenna is placed inside the single-strand helical spring of the helical radiating antenna.

* * * * *